3,639,627
METHOD OF COMBATTING CHEWING INSECT LARVAE SPECIES OF THE ORDER LEPIDOPTERA USING N,N'-DICYCLOPROPYL DITHIOOXAMIDE
Gerhard H. Alt, St. Louis, Mo., assignor to Monsanto Company, St. Louis, Mo.
No Drawing. Filed Nov. 14, 1968, Ser. No. 775,918
Int. Cl. A01n 9/20
U.S. Cl. 424—320       4 Claims

ABSTRACT OF THE DISCLOSURE

N,N'-dicyclopropyl dithiooxamide which is useful in combatting chewing insect larvae species of the order Lepidoptera, particularly species of the family Noctuidae.

This invention relates to N,N'-dicyclopropyl dithiooxamide

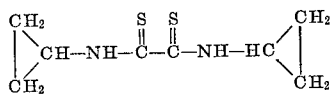

which new compound is prepared as follows:

To a suitable reaction vessel equipped with an agitator and thermometer is charged 11.4 parts by weight of cyclopropylamine, 12.0 parts by weight of dithiooxamide, and approximately 63 parts by weight of ethyl alcohol. The so charged mass is heated to about 50° C. and maintained at about that temperature for four hours while agitating the mass. The mass is then cooled to room temperature and filtered. The filter cake is recrystallized from ethyl alcohol to give N,N'-dicyclopropyl dithiooxamide, orange crystals melting at 71–73° C.

The compound of this invention is particularly useful in combatting chewing insect larvae species of the order Lepidoptera, particularly larvae species of the family Noctuidae, and to illustrate such but not limitative thereof is the following:

(a) Cotton bollworm larvae

A solution of the dithiooxamide to be evaluated (itemized in Table I below) is prepared by dissolving same in sufficient acetone to provide a concentration of the particular dithiooxamide of 10.0 micrograms per microliter. One microliter of this solution via a microinjection apparatus is applied directly upon the dorsum of the thorax of each of 10 cotton bollworm larvae (Heliothis zea) which 10 so treated larvae are placed immediately in a vial containing an agar base rearing medium therefor. Two replicates were included for each dithiooxamide. Forty-eight (48) hours at 80° F. after the placement in the vial mortality observations were made. The average percent mortality for each dithiooxamide at a concentration of 10.0 micrograms per larva was found to be as follows:

TABLE I

| Dithiooxamide: | Percent kill at a conc. of 10.0 micrograms per larva |
|---|---|
| N,N'-dicyclopropyl dithiooxamide | 90 |
| N,N'-diallyl dithiooxamide | 0 |
| N,N'-diisopropyl dithiooxamide | 20 |
| N,N'-di-n-propyl dithiooxamide | 0 |

(b) Southern armyworm larvae

A solution of the dithiooxamide to be evaluated (itemized in Table II below) is prepared by dissolving same in sufficient acetone to provide a concentration of the particular dithiooxamide of 1.0 microgram per microliter. One microliter of this solution via a microinjection apparatus is applied directly to each of 10 lima bean leaf discs 0.25 inch in diameter. Thereafter individual second instar southern armyworm larvae (Prodenia eridania) are placed beside each leaf disc and the disc and larva encaged with a plastic cap 0.875 inch in diameter. Two replicates were included for each dithiooxamide. Forty-eight (48) hours at room temperature after the encagement mortality observations were made. The average percent mortality for each dithiooxamide at the concentration of 1.0 microgram per larva was found to be as follows:

TABLE II

| Dithiooxamide: | Percent kill at a conc. of 1.0 microgram per larva |
|---|---|
| N,N'-dicyclopropyl dithiooxamide | 100 |
| N,N'-dimethyl dithiooxamide | 0 |
| N,N'-dicyclohexyl dithiooxamide | 0 |
| N,N'-di-n-butyl dithiooxamide | 0 |
| N,N'-diallyl dithiooxamide | 0 |

Although the dithiooxamide of this invention is useful per se in destroying Lepidoptera larvae, it is preferable that it be supplied to the larvae or to the environment of the larvae in a dispersed form in a suitable extending agent. The exact concentration of the dithiooxamide of this invention employed in destroying said larvae can vary considerably provided the required dosage (i.e. toxic or larvicidal amount) thereof is supplied to the larvae or to the environment of the larvae. When the extending agent is a liquid or mixture of liquids (e.g. as in solutions, suspensions, emulsions, or aerosols) the concentration of the dithiooxamide employed to supply the desired dosage generally will be in the range of 0.001 to 50 percent by weight. When the extending agent is a semi-solid or solid, the concentration of the dithiooxamide employed to supply the desired dosage generally will be in the range of 0.1 to 25 percent by weight. From a practical point of view, the manufacturer must supply the user with a low cost concentrate or spray base or particulate solid base in such form that, by merely mixing with water or finely divided inert solid extender (e.g. powdered clay or talc) or other low cost material available to the user at the point of use, he will have an easily prepared larvicidal spray or particulate solid. In such a concentrate composition, the dithiooxamide generally will be present in a concentration of 5 to 95 percent by weight, the residue being any one or more of the well known pesticidal adjuvants, such as the surface-active clays, solvents, diluents, carrier media, adhesives, spreading agents, humectants, and the like, but particularly a finely divided solid extender.

There are a large number of organic liquids which can be used for the preparation of solutions, suspensions or emulsions of the dithiooxamide of this invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g. an aromatic hydrocarbon and an aliphatic ketone.

When the dithiooxamide of this invention is to be supplied to the larvae or to the environment of the larvae as aerosols, it is convenient to dissolve it in a suitable solvent and disperse the resulting solution in dichlorodifluoromethene or like chlorofluoroalkane which boils below room temperature at atmospheric pressure.

The dithiooxamide of this invention is preferably supplied to the larvae or to the environment of the larvae in in the form of emulsions or suspensions. Emulsions or suspensions are prepared by dispersing the dithiooxamide of this invention either per se or in the form of an organic solution thereof in water with the aid of a water-soluble non-ionic or anionic surfactant or mixtures thereof. The term "surfactant" as employed here and in the appended claims is used as in Volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides" second edition, p. 280). The surfactants contemplated are the well-known capillary active substances which are non-ionic or anionic and which are described in detail in Volumes I and II of Schwartz, Perry and Berch's "Surface Active Agents and Detergents," (1958, Interscience Publishers, Inc., New York) and also in the November 1947 issue of Chemical Industries (pp. 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to non-ionizing capillary active substances are incorporated in this specification by reference in order to avoid unnecessary enlargment of this specification. The preferred surfactants are the water soluble anionic and non-ionic surface active agents set forth in U.S. 2,846,398 (issued Aug. 5, 1958).

The dithiooxamide of this invention can be dispersed by suitable methods (e.g. tumbling or grinding) in solid extending agents either of organic or inorganic nature and supplied to the larvae environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials or organic nature as powdered cork, powdered wood, and powdered walnut shells. The preferred solid carriers are the adsorbent clays, e.g. bentonite. These mixtures can be used for larvicidal purposes in the dry form, or by addition of water-soluble anionic or non-ionic surfactants the dry particulate solids can be rendered wettable by water so as to obtain stable aqueous dispersions or suspensions suitable for use as sprays.

For special purposes the dithiooxamide of this invention can be dispersed in a semi-solid extending agent such as petrolatum with or without the aid of solubility promoters and/or surfactants.

In all of the forms described above the dispersions can be provided ready for use in combatting the larvae or they can be provided in a concentrated form suitable for mixing with or dispersing in other extending agents. As illustrative of a particularly useful concentrate is an intimate mixture of the dithiooxamide of this invention with a water-soluble anionic or non-ionic surfactant or mixtures thereof which lowers the surface tension of water in the weight proportions of 0.1 to 15 parts of surfactant with sufficient of the dithiooxamide of this invention to make 100 parts by weight. Such a concentrate is particularly adapted to be made into a spray for combatting various forms of Lepidoptera larvae by the addition of water thereto. As illustrative of such a concentrate is an intimate mixture of 20 parts by weight of N,N'-dicyclopropyl dithiooxamide and from 2 to about 4 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for combatting Lepidoptera larvae is a solution (preferably as concentrated as possible) of the dithiooxamide of this invention in an organic solvent therefor. The said liquid concentrate preferably contains dissolved therein a minor amount (e.g. 0.5 to 10 percent by weight of the weight of the new larvicidal agent) of a non-ionic or anionic surfactant, which surfactant is also water-soluble. As illustrative of such a concentrate is a solution of N,N'-dicyclopropyl dithiooxamide in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

The dithiooxamide of this invention can also be advantageously employed in combination with other pesticides, including, for example, nematocides, bactericides, fungicides, and herbicides. In this manner it is possible to obtain mixtures which are effective against a wide variety of pests and other forms of noxious life.

In the destruction of Lepidoptera larvae the dithiooxamide of this invention either per se or compositions comprising same are supplied to the larvae or to their environment in a toxic or larvicidal amount. This can be done by dispersing the new Lepidoptera larvicidal agent or larvicidal composition comprising same in, on or over an infested environment or in, on or over an environment the larvae frequent, e.g. agricultural soil or other growth media or other media attractable to the larvae for habitational or sustenance purposes, in any conventional fashion which permits the larvae to be subject to the larvicidal action of the dithiooxamide of this invention. Such dispersing can be brought about by applying sprays or particulate solid compositions to a surface infested with the larvae or attractable to the larvae, as for example, the surface of an agricultural soil or other habitat media such as the above ground surface of host plants by any of the conventional methods, e.g. power dusters, boom and hand sprayers, and spray dusters. Also for sub-surface application such dispersing can be carried out by simply mixing the new larvicidal agent per se or larvicidal spray or particulate solid compositions comprising same with the infested environment or with the environment the larvae frequent, or by employing a liquid carrier for the new larvicidal agent to accomplish sub-surface penetration and impregnation therein.

What is claimed is:

1. The method of combatting chewing insect larvae species of the order Lepidoptera which comprises applying to said larvae an insecticidal amount of N,N'-dicyclopropyl dithiooxamide.

2. The method of claim 1 wherein the chewing insect larvae species is of the family Noctuidae.

3. The method of claim 2 wherein the chewing insect larvae species is *Heliothis zea*.

4. The method of claim 2 wherein the chewing insect larvae species is *Prodenia eridania*.

References Cited

UNITED STATES PATENTS

| 2,525,075 | 10/1950 | Levesque | 260—551 S |
| 2,531,283 | 11/1950 | Levesque | 260—551 S |
| 2,772,309 | 11/1956 | Doerwer | 260—551 S |
| 3,318,675 | 5/1967 | Olin | 260—551 S |

JEROME D. GOLDBERG, Primary Examiner

U.S. Cl. X.R.

260—551